United States Patent [19]

Bush

[11] Patent Number: 4,934,042

[45] Date of Patent: Jun. 19, 1990

[54] LAMINATION TO ROTOR SHAFT RETENTION METHOD UTILIZING SPRING PINS

[76] Inventor: Timothy J. Bush, 26 E. Sunset Dr. #10, Champlin, Minn. 55316

[21] Appl. No.: 248,583

[22] Filed: Oct. 25, 1988

Related U.S. Application Data

[62] Division of Ser. No. 109,104, Oct. 16, 1987, Pat. No. 4,792,713.

[51] Int. Cl.$^5$ ............................................. H02K 15/02
[52] U.S. Cl. ...................................... 29/598; 29/450; 310/42; 310/261
[58] Field of Search ......................... 29/596, 598, 450; 310/42, 261

[56] References Cited

U.S. PATENT DOCUMENTS

| | | |
|---|---|---|
| 1,467,938 | 9/1923 | Janette . |
| 1,677,762 | 7/1928 | Gilburg . |
| 1,681,914 | 8/1928 | Barr . |
| 1,782,521 | 11/1930 | Trombetta . |
| 2,421,115 | 5/1947 | Carlson . |
| 2,429,180 | 10/1947 | Barlick . |
| 2,506,637 | 5/1950 | Fog . |
| 2,807,485 | 12/1957 | Seibert . |
| 2,977,491 | 3/1961 | Hueffed et al. . |
| 3,421,783 | 1/1969 | Sakai . |
| 3,802,068 | 4/1974 | Scott . |
| 3,828,426 | 8/1974 | Phelon et al. . |
| 4,053,801 | 10/1977 | Ray et al. . |
| 4,087,709 | 5/1978 | Haydon . |
| 4,149,309 | 4/1979 | Mitsui . |
| 4,358,215 | 11/1982 | Rivin . |
| 4,395,815 | 8/1983 | Stanley et al. . |
| 4,437,203 | 3/1984 | Greutmann . |
| 4,450,856 | 5/1984 | Kocher . |
| 4,453,101 | 6/1984 | Nelson . |
| 4,485,320 | 11/1984 | Kawada et al. . |

FOREIGN PATENT DOCUMENTS

| | | |
|---|---|---|
| 416839 | 7/1925 | Fed. Rep. of Germany . |
| 596012 | 4/1934 | Fed. Rep. of Germany . |
| 1170055 | 5/1964 | Fed. Rep. of Germany . |

OTHER PUBLICATIONS

Rexnord Bulletin No. 122, (©1979 Rexnord, Inc.).
Driv-Lok, Inc. advertisement (©Driv-Lok, Inc., 1973).
RBC© Tolerance Rings brochure.

Primary Examiner—Carl E. Hall

[57] ABSTRACT

A lamination stack assembly is provided comprising elongated, resilient spring pin members for exerting radially outward force when in deformed states; a rotational member having an outer surface; and a plurality of laminates, each having an inner edge defining an opening for receiving the rotational member. The spring pin members are disposed axially along the rotational member intermediate of the outer surface of the rotational member and the inner edge of the laminates, and cooperate with the rotational member and the inner edges of the plurality of laminates to prevent relative rotational slippage of the laminates with respect to the rotational member. The shaft preferably includes axially extending grooves for receiving the spring pin members which cooperate with notches in an inner edge of each of the plurality of laminates to receive the spring pin members. Each of the spring pin members preferably includes a hollow cylinder having an exterior wall defining an axially extending gap in the wall, wherein the gap varies in width from a normal state to a deformed state. Preferably, the spring pin members are made of hardened steel.

3 Claims, 3 Drawing Sheets

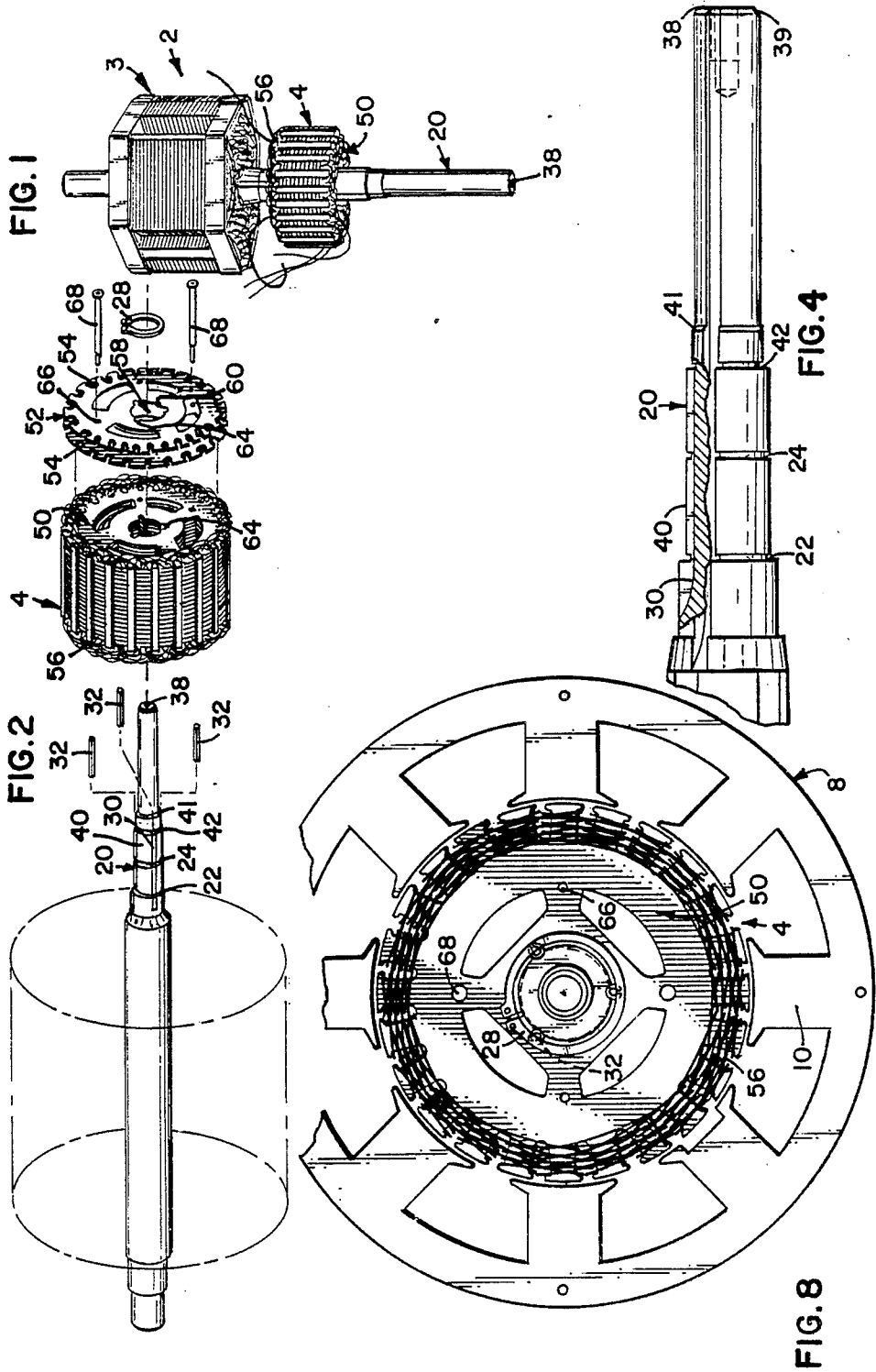

LAMINATION TO ROTOR SHAFT RETENTION METHOD UTILIZING SPRING PINS

This is a division of application Ser. No. 109,104, filed Oct. 16, 1987, now U.S. Pat. No. 4,792,713.

FIELD OF THE INVENTION

The invention relates to the manufacture of generator rotors, specifically exciter armatures preferably including lamination stacks, and more specifically to the manufacture of an exciter armature which is secured against rotational slippage about a rotating member, preferably a rotor shaft.

BACKGROUND OF THE INVENTION

In the manufacture of generators or dynamoelectric motors, in particular motors for high current applications, such as starter motors, a stack of armature laminations are generally pressed onto a rotor shaft to produce a laminated armature having a plurality of radial slots to receiving windings made of conductive material. Because of magnetic drag and torsional vibrations which occur as the lamination stack and the shaft are rotated axially at great speeds, there has been a tendency for the lamination stack to slip torsionally with respect to the shaft. If the stack slips with respect to the shaft, two things can occur. First, the power generation in the armature is adversely affected, and second, a clearance can develop between the shaft and the stack. If it is large enough to permit the stack to vibrate, or chatter, with respect to the shaft, the clearance will increase in size over time. In such instances, the shaft and the lamination stack are soon damaged beyond repair and generally require replacement.

In order to prevent this problem from occurring, rotor shafts have been machined to very close tolerances so that the lamination stack may be pressed onto the shaft, precisely machined, thereby providing a "press on", or an interference fit, between the stack and the shaft which resists torsional or rotational slippage therebetween. Unfortunately, this requires tolerances of a few ten-thousandths of an inch which requires precision machining which can be quite expensive. Furthermore, it is difficult to assemble the lamination stack upon the shaft because of the very closer tolerances. A press is required to hold the lamination stack in place as the shaft is pressed into the shaft. This adds to the manufacturing costs. In addition, it is very difficult to remove the lamination stack form the shaft, particularly in the field, where specialized tools are not available. It is equally difficult to place the lamination stack back on the shaft one it has been removed. Furthermore, when a lamination stack is removed and put back on a shaft, the wear caused by the removal and reassembly causes the clearances to change and the stack can begin to vibrate ever so slightly. In time the clearance increases due to the vibrations, which further damage the shaft and the stack, and can lead to slippage. Eventually, the shaft and the stack, in such a case, require replacement.

Another method of preventing rotational slippage of a lamination stack about a shaft is to provide a shaft having a shoulder and a threaded portion. A large nut is used to tighten the lamination stack down upon the shoulder, thereby clamping the stack against the shoulder. This prevents the stack form slipping for a period of time, but it requires some sort of safety device on the nut, such as a nylon insert, a lock tab washer, or the like, in order to prevent the nut from coming loose. This introduces an additional cost. It is also quite expensive to machine threads onto the shaft and is expensive to provide a large shoulder. Ordinarily, the smaller the shoulder, the less expensive the shaft. In this case, it is desirable to provide as much shoulder area as possible. This is because the clamping force, which opposes the torsional forces which cause the torsional or rotational slippage of the lamination stack about the shaft, is determined by the force of the clamp and the area which is being clamped. Therefore, although it is less economical to make a large shoulder, it may be necessary in order to provide sufficient clamping force to prevent rotational slippage. In addition, although not as difficult to assemble as the lamination stack assembly which require a "press on", or interference fit, these threaded shaft assembly require a fixture to hold the shaft in place, a specialized torque wrench, and special care to be certain that the nut is torqued to precise specifications.

The present invention provides solutions to these and other problems and difficulties presented by known manufacturing techniques.

SUMMARY OF THE INVENTION

The present invention provides a lamination stack device used with a prime mover, the prime mover being a shaft. The lamination stack device comprises pin means and a plurality of laminates. Each of the laminates has an inner edge defining an opening for receiving the shaft. The laminates cooperate such that they can be stacked one adjacent to another in series. The pin means cooperate with the shaft and the inner edges of the plurality of laminates, when the laminates are stacked, to prevent relative rotational slippage therebetween.

Preferably, the laminates include notch means in the inner edges thereof for receiving the pin means, wherein the pin means is received in the notch means and in axially extending groove means in the shaft. The pin means preferably include a plurality of elongated, resilient, spring pin members which preferably include three spring pin members disposed circumferentially about the shaft at 120° intervals.

In accordance with the present invention a lamination stack assembly is also provided comprising elongated, resilient spring pin means for exerting radially outward force when in deformed states; a rotational member having an outer surface; and a plurality of laminates. Each of the laminates have an inner edge defining an opening for receiving the rotational member. The spring pin means are disposed axially along the rotational member intermediate of the outer surface of the rotational member and the inner edges of the laminates. The spring pin means cooperate with the rotational member and the inner edges of the plurality of laminates to prevent relative rotational slippage of the laminates with respect to the rotational member.

Preferably, the rotational member includes a shaft and the shaft includes axially extending groove means for receiving said spring pin means. Each of said laminates preferably includes axially disposed notch means in the inner edges of the laminates for receiving the spring pin means. The notch means cooperate with the groove means to receive the spring pin means. The spring pin means preferably include a plurality of elongated, resilient spring pin members. Preferably, each spring pin member includes a hollow cylinder having an exterior wall defining an axially extending gap in said wall. The gap varies in width from a normal state to a deformed state. Preferably, the spring pin members are in deformed states and exert radially outward forces upon the inner edges of the laminates and the outer surface of the shaft, thereby restraining the plurality of laminates from sliding axially along the shaft.

In accordance with the present invention, a method of preventing rotational slippage of an axial sleeve member about a shaft is also provided. The method comprises providing the shaft with axially extending groove means in an outer surface of the shaft for receiving a plurality of elongated, resilient spring pin members; providing the axial sleeve member with axially extending notch means in an inner edge of the sleeve member for receiving the plurality of spring pin members; positioning the axial sleeve member on the shaft such that the groove means and the notch means are in radial alignment so as to form axially extending keyway means for retaining the spring pin members; and forcing the spring pin members in said keyway means such that the axial sleeve member is prevented from sliding radially around the shaft. The spring pin members preferably include a hollow cylinder having an exterior wall defining an axially extending gap in the wall which varies in width from a normal state to a deformed state. The spring pin members are preferably in a deformed state after being forced into the keyway means such that each of the spring pin members exerts a radially outward force upon the outer surface of the shaft and the inner edge of the sleeve member such that axial slippage of the sleeve member along the shaft is resisted. Preferably, the plurality of spring pin members include three spring pin members disposed circumferentially about the shaft at 120° intervals.

The present invention provides many advantages over the prior art. First, extremely close tolerances between the rotational member or shaft and the sleeve member or lamination stack are not required for the present invention which minimizes the cost of manufacturing. Rather than requiring tolerances of several ten-thousandths of an inch, tolerances of about a few thousandths of an inch are permissible. This difference in the required tolerances allows for a significant cost savings on machining, particularly as it regards the rotor shaft. Furthermore, it is much easier to assemble the lamination stack assembly than either of the prior art assemblies cited hereinabove. The lamination stack may be placed upon the shaft and the spring pin members may be driven into the keyways at a worker's bench without the need of specialized tools as are required for the prior art assemblies. Furthermore, the present invention is easily disassembled and reassembled without causing damage to the parts which would eventually require replacement of those parts. The lamination stack assembly of the present invention may also be disassembled and assembled in the field because of the simple method of disassembly and assembly which the invention provides.

Another very significant advantage of the present invention is that the spring pin members provide a positive antirotational lock of the lamination stack about the shaft. The spring pin members are slightly deformed when they are forced into the keyways between the lamination stack and the shaft. Because the spring pin members are made of a resilient material, preferably a hardened steel, they exert radially outward forces upon the inner edges of the laminates and the outer surface of the shaft thereby resisting axial slippage of the laminates with respect to the shaft.

When the following terms are used in the present application they have the following additional meanings. The term "cylinder" means "cylinder-like" and does not require that a complete cylinder shape be present, but recognizes that the cylinder may be missing portions of a true cylinder shape without meaning that a cylinder does not, therefore, exist, and cannot, therefore, be referred to as a cylinder. A "normal state" is a state in which there is no stress or added tension. A "deformed state" is one in which there is a tension or a stress, or a stress on the material which does not exist in the "normal state". This stress or tension generates a force which is exerted against objects which are directly adjacent to the object which is in a deformed state.

The above described features and advantages along with various other advantages and features of novelty are pointed out with particularity in the claims of the present application. However, for a better understanding of the invention, its advantages, and objects attained by its use, reference should be made to the drawings which form a further part of the present application and to the accompanying descriptive matter in which is illustrated and described preferred embodiments of the present invention.

BRIEF DESCRIPTION OF THE DRAWINGS

Drawings of a preferred embodiment of the present invention are provided herein as summarized below:

FIG. 1 is a perspective view of a generator rotor including an exciter armature including a lamination stack engaged upon a rotor shaft;

FIG. 2 is an exploded perspective view of lamination stack and the shaft shown in FIG. 1;

FIG. 4 is an enlarged perspective of a fragmentary portion of the shaft shown in FIG. 2;

FIG. 8 is an end view of an exciter armature lamination stack in its environment within an exciter field lamination stack.

DETAILED DESCRIPTION OF THE PREFERRED EMBODIMENT

Figure 5:
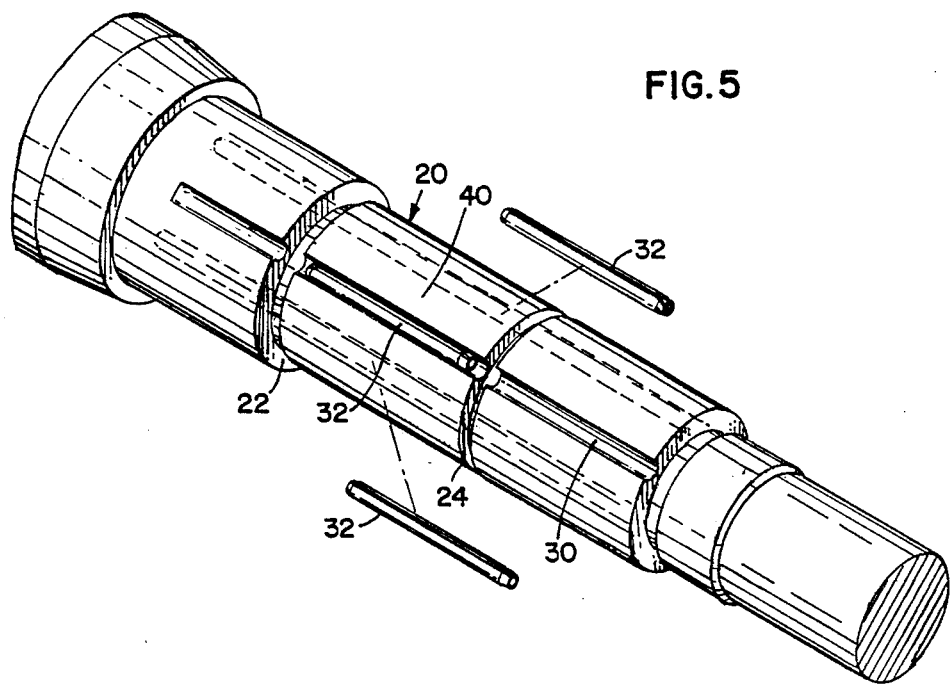
FIG. 5 is an enlarged perspective view of a fragmentary portion of the shaft shown in FIGS. 2 and 4.
Figure 3:
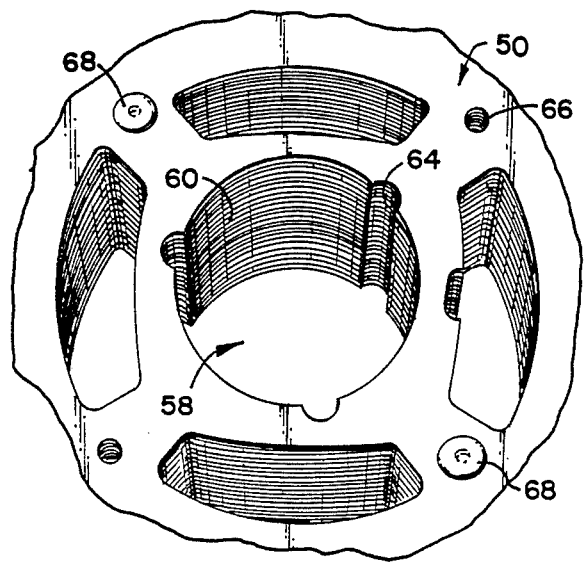
FIG. 3 is an enlarged perspective view of a fragment of the lamination stack shown in FIG. 2.

Referring to the drawings, there is illustrated in FIG. 1 a preferred embodiment of a generator rotor 2 in accordance with the present invention including a main field 3, an exciter armature 4 upon a rotor shaft 20. The armature 4 includes a plurality of laminates 52 forming a lamination stack 50 wrapped in continuous conductive windings 56. Referring now also to FIG. 2, the shaft 20 includes a shoulder 22 which extends circumferentially around the shaft 20, and a circumferentially extending snapping groove 24 for receiving a snap ring 28. The lamination stack 50 includes a plurality of laminates 52 which are assembled, preferably bound, one adjacent to another, or one on top of another, in series to form the lamination stack 50. The laminates are identical metal stampings, preferably made of a relatively soft steel.

The laminates have slots 54 for receiving the conductive windings 56 made of materials which conduct electricity, preferably copper wire which may or may not be insulated. Each laminate also includes an opening 58 defined by a radially facing inner edge 60. Notches 64 are located in the inner edges 60 of each laminate 52 at 120° intervals.

Figure 6:
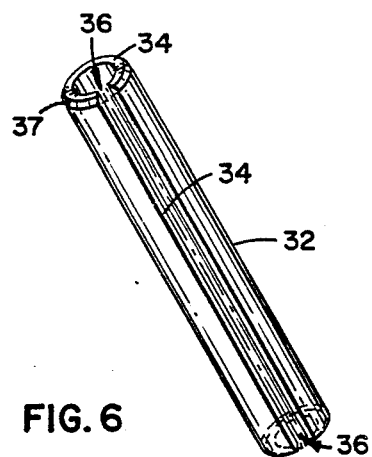
FIG. 6 is an enlarged perspective view of a spring pin member in a "normal state" and showing a "deformed state" in phantom.
Figure 7:
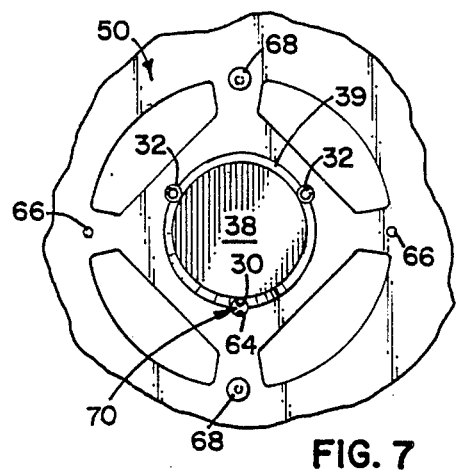
FIG. 7 is an enlarged perspective view of a fragment of the lamination stack upon fragment of a shaft.

Referring now also to FIGS. 3-7, the shaft 20 has axially extending grooves 30 circumferentially disposed at 120° intervals about the shaft 20 for receiving spring pin members 32. The spring pin members 32 are hollow cylinders which include a wall 34 defining an axially extending gap 36 which varies in width when the spring pin 32 is deformed from a normal state as shown in FIG. 6, to a deformed state as shown in phantom in FIG. 6. The elongated, resilient spring pin members 32 have a beveled spring pin chamfer 37 at each end, and are preferably made of hardened steel.

The laminates 52 of the lamination stack 50 are preferably bound together. The laminates include rivet receiving openings 66 for receiving rivets 68 which extend through the lamination stack 50 and bind the laminates 52 together. After the laminates 52 are aligned such that the openings 66, notches 64, and slots 54 on all of the laminates 52 are aligned, the rivets 68 are inserted through the openings 66 in all of the laminates 52 and finished off to bind the laminates 52 together in the lamination stack 50. The conductive windings 56 may then be wound or threaded through the slots 54.

Once the lamination stack 50 has been assembled it may be placed on the rotor shaft 20 by sliding the lamination stack 50 over the receiving end 38 of the shaft 20 until it engages the outer surface 40 of the shaft 20 after the stack 50 passes a second rise 42 in the shaft 20. When the laminates 52 are bound together to form the lamination stack 50 they are like a sleeve member around the rotor shaft 20 and the inner edges 60 of the laminates 52 combine to form a radially facing inner edge of the sleeve member. The clearance between the inner edges 60 of the laminates 52 and the outer surface 40 of the shaft 20 above the second rise 42 is preferably about a few thousandths of a inch. Once the stack 50 has engaged the stack 20 above the second rise 42 it may slide up against the shoulder 22. The notches 64 are disposed at 120° intervals around the inner edge 60 of each of the laminates 52. When the lamination stack 50 is assembled, those notches 64 are aligned at these intervals. Once the stack 50 is engaged upon the shaft 20, the aligned notches 64 of the stack 50 may be aligned with the axially extending grooves 30 for receiving the elongated, resilient spring pin members 32. The aligned notches 64 and the grooves 30 cooperate to provide keyways 70 for receiving and retaining the resilient spring pin members 32 at 120° intervals about the shaft 20. The spring pin members 32 may be driven into the grooves 30 and the notches 64 once the notches 64 have been aligned with the grooves 30 to form the keyways 70. The beveled spring pin chamfer 37 enables the end of the spring pin member 32 to be easily introduced into the keyways 70, whereupon they can be forced or driven into the keyways 70. When the spring pin members 32 are driven into the keyways 70, the spring pin members 32 are slightly deformed so that they will exert a radially outward force upon the inner edges 60 of the laminates 52 proximate the notches 64 and upon the outer surface 40 of the shaft 20 proximate the grooves 30. This force resists axial movement, or axial slippage of the laminates 52 and the lamination stack 50 axially along the shaft 20. Because the spring pin members 32 are resilient, and preferably hardened steel, the force exerted by the spring pin members radially outward provides a positive lock of the lamination stack 50 on the shaft 20. Preferably, in order to move the lamination stack 50 axially along the shaft 20, it will require a shock force at the receiving end 38 of the shaft 20 of about 2,000-4,000, preferably 2,500-3,500, more preferably about 3,000 pounds in order overcome the friction created by the resilient, hardened steel spring members 32 of the preferred embodiment when they are engaged in the keyways 70.

The spring pin members 32 prevent torsional or rotational slippage of the lamination stack 50 and the laminates 52 with respect to the shaft 20. In the preferred embodiment shown in the drawings, three spring pin members 32 are engaged in three keyways 70 in order to prevent rotational slippage of the lamination stack 50 with respect to the stack 20. It is important that the keyways 70 and the spring pins 32 are spaced at even intervals circumferentially around the shaft 20. In the preferred embodiment the keyways 70 and the spring pins 32 are positioned circumferentially about the shaft 20 at intervals of 120°. In alternate embodiments where fewer or more keyways 70 and spring pin members 32 are provided, it will be important to be substantially certain that the keyways 70 and spring pin members 32 are evenly spaced about the shaft in order to provide for a balanced and, therefore, properly working assembly. Any number of spring pin members 32 may be used so long as there is at least a plurality. FIG. 8 shows an exciter armature 4 on a shaft 20 in its working environment inside an exciter field lamination stack 8. It will be appreciated that because the clearance between the exciter armature 4 and the exciter field laminations 10 is relatively small, it is important to center the generator rotor 2 in all respects. The clearance between the exciter armature 4 and the exciter field lamination stack 8 is generally minimized in order to maximize energy efficiency. In order to minimize the clearance it is important to balance the rotor 2 so that the exciter armature 4 will spin in a concentric circle with respect to the inside of the exciter field lamination stack 8.

In the preferred embodiment having three spring pin members 32 and three keyways 70, the spring pin members 32 will prevent torsional slippage until the torsional forces become so great that all three resilient spring pin members 32 are sheared along their longitudinal axes. It will be appreciated that, although spring pins are known, it is not believed that they are known to have been used for such a purpose. In fact, shear strength specifications for spring pins are generally given with respect to the transverse shear force the pins are designed to withstand. It is not believed, therefore, that manufacturers have contemplated the use of spring pins in this way, requiring knowledge of the resistance of the spring pins to a longitudinal shear force.

The radial force which is exerted outward from the spring pin members 32 when they are deformed provides for axial retention of the lamination stack 50. The force required to move the stack 50 axially along the shaft 20, and to overcome the friction generated by the force exerted radially outward by the spring pin members 32 is about 2,000-4,000, preferably about 2,500-3,500, more preferably about 3,000 pounds. It is believed that the force depends upon the length of the stack 50 and the exact coefficient of friction. Since these are variable parameters it is expected that the force required to move the stack will vary depending upon these parameters.

The preferred embodiment of the present invention provides an added safety feature which will resist the axial movement or slippage of the lamination stack. The shoulder 22 prevents the stack 50 from slipping axially past the shoulder 22. On the other side of the stack 50, when the stack 50 is engaged upon the shaft 20, is a snap ring groove 24 for receiving a snap ring 28. The snap ring 28 extends above the outer surface 40 of the shaft 20, thereby resisting the movement, or resisting the axial slippage, of the lamination stack 50 axially along the shaft 20.

The generator rotor 2 of the present invention can be disassembled or removed from the shaft 20 in at least two ways. First, a punch may be used to drive the spring pin members 32 through the keyways 70 if the grooves 30 are long enough to accommodate the spring pin members 32 beyond the shoulder 22 on the end of the shaft 20 away from the receiving end 38. The spring pin members 32 must be driven out of the keyways 70 and beyond the shoulder 22 in order to disengage the spring pin members 32 from the lamination stack 50. An alternate embodiment could be designed in this way, however, the preferred embodiment illustrated in the drawings does not have grooves 30 long enough to accommodate the spring pin members 32 in this manner. The second method of removing the lamination stack 50 from the rotor shaft 20 is to hold the generator rotor 2 upright while supporting the exciter armature 4 and striking the receiving end 38 of the shaft 20 with a rubber mallet or other hard object until the armature 4 slides off the shaft 20. It will be appreciated that the snap ring 28 must be removed before this operation may take place. This "shock loading" method is relatively easy and can be accomplished without damaging the stack 50 or the shaft 20. Because of the relatively large tolerances which provide a clearance between the laminates 52 and the shaft 20 of about a few thousandths of an inch, the rotor 2 may be disassembled and reassembled many times in the field or in the shop without damaging the stack 50 or the shaft 20 such that either part must be replaced. This is because this method of preventing torsional slippage depends upon the use of the spring pin members 32 rather than on close tolerances. In addition, because the tolerances are not extremely precise, the parts are easily interchangeable. When one part must be replace, it may be replaced without replacing the other part. The lack of need for close tolerances also allows for a cost savings in manufacturing the shaft which can be significant on a production scale.

While certain representative embodiments of the present invention have been described herein for the purposes of illustration, it will be apparent to those skilled in the art that modifications therein may be made without departing from the spirit and scope of the present invention.

What is claimed is:

1. A method of preventing rotational slippage of an axial sleeve member about a shaft, said method comprising the steps of:
    (a) providing the shaft with axially extending groove means in an outer surface of the shaft for receiving a plurality of elongated, resilient spring pin members;
    (b) providing an axial sleeve member with axially extending notch means in an inner surface of the sleeve member for receiving said plurality of spring pin members, said axial sleeve member including a plurality of laminates cooperating to form a lamination stack, edges of said plurality of laminates forming said inner surface and defining said notch means;
    (c) positioning the axial sleeve member on the shaft such that the groove means and the notch means are in radial alignment so as to form axially extending keyway means for retaining said spring pin members; and
    (d) forcing the spring pin members into said keyway means such that the axial sleeve member is prevented from sliding radially around the shaft and said pin members are radially biased against said edges of said plurality of laminates defining said notch means.

2. The method of claim 1 wherein each of said spring pin members include a hollow cylinder having an exterior wall defining an axially extending gap in said wall, said gap varying in width from a normal state to a deformed state, said spring pin members being in a deformed state after being forced into said keyway means in step (d) such that each of said spring pin members exerts a radially outward force upon the outer surface of the shaft and the inner edge of the sleeve member such that axial slippage of the sleeve member along the shaft is resisted.

3. The method of claim 2 wherein said plurality of spring pin members include three spring pin members disposed circumferentially about the shaft at 120° intervals.

* * * * *